United States Patent [19]

Ryan

[11] Patent Number: 4,824,382

[45] Date of Patent: Apr. 25, 1989

[54] ADAPTER FOR A WELDER

[76] Inventor: Richard P. Ryan, 5633 Lilac Blossom La., San Jose, Calif. 95124

[21] Appl. No.: 224,237

[22] Filed: Jul. 25, 1988

Related U.S. Application Data

[63] Continuation of Ser. No. 66,308, Jun. 25, 1987, abandoned.

[51] Int. Cl.$^4$ .................... H01R 4/66; H01R 21/00
[52] U.S. Cl. .......................... 439/105; 439/106
[58] Field of Search ............. 439/105, 106, 108, 692, 439/695, 696, 92, 682, 685–687, 690

[56] References Cited

U.S. PATENT DOCUMENTS 3,828,297  8/1974  Hoza, III ........................ 439/105
4,313,148  1/1982  Turner ............................. 439/106

FOREIGN PATENT DOCUMENTS 0659313  2/1965  Belgium ........................... 439/105
0155491  12/1979  Japan .............................. 439/105

*Primary Examiner*—Gary F. Paumen
*Attorney, Agent, or Firm*—John J. Leavitt

[57] ABSTRACT

An adapter comprising a tubular housing carrying a 110 to 125 volt type plug receptacle is disclosed. The plug receptacle forms the output side of the adapter, with the input side consisting of a metallic pick-up strip for insertion into the electrode holder carried by the output lead of an electric arc welder. The input side of the adapter also includes a fused ground clip which is connectable onto an electrical ground such as the grounded output lead of an arc welder.

2 Claims, 1 Drawing Sheet

ADAPTER FOR A WELDER

This application is a continuation of application Ser. No. 066,308, filed June 25, 1987, now abandoned.

BACKGROUND OF THE INVENTION

1. Field of the Invention

The present invention relates, in general, to an adapter for providing electrical power from a welding machine, and more particularly to apparatus for connecting a conventional three-prong electrical receptacle to a welding machine's output lead and ground lead to make it possible to couple an electrical 110 to 125 volt type plug to a welding machine's output.

2. Description of Prior Art

There are many problems a welder must face when constructing a building, one of which is finding a source of electrical power for his power hand tools. Usually, sources of standard 110 to 125 volt electrical power are hundreds of feet away from where the welder is working. Attempts have been made to alleviate this problem by putting a standard 110 to 125 volt receptacle on the welding machine itself, but the welder is usually so far away from the machine that an extension cord has to be run between the welding machine and where the welder is actually working. It is the purpose of this invention to eliminate the need for an extension cord and to provide a convenient electrical plug receptacle for the welder.

SUMMARY OF THE INVENTION

In accordance with a preferred form of the present invention, an adapter for providing electrical power from a welding machine includes a tubular housing and an electrical plug receptacle mounted in the housing. The plug receptacle has a ground and first and second power poles extending inwardly into the housing. A ground wire is provided for the adapter, with the ground wire being electrically connected at one end to the ground pole on the electrical plug receptacle as well as to the first power pole, and being connected at the other end to a ground clip for connection to an electrical ground point.

The second power pole of the electrical plug is electrically connected to a male power pick-up strip which extends from the tubular housing and which is connectable to the electrode holder of the welding machine, the electrode holder being connected to the output welding lead of that machine to provide power to the adapter plug receptacle. For safety, a sleeve of elastic material surrounds and protects the housing and the power pick-up strip. A resin potting material fills the housing and surrounds the ground and power poles. A suitable fuse is provided in the ground wire.

DESCRIPTION OF THE DRAWINGS

The various objects, features and advantages of the present invention will be evident to those of skill in the art from a consideration of the following detailed description of a preferred embodiment thereof, taken in conjunction with the accompanying drawings, in which.

DESCRIPTION OF PREFERRED EMBODIMENT

Figure 1:
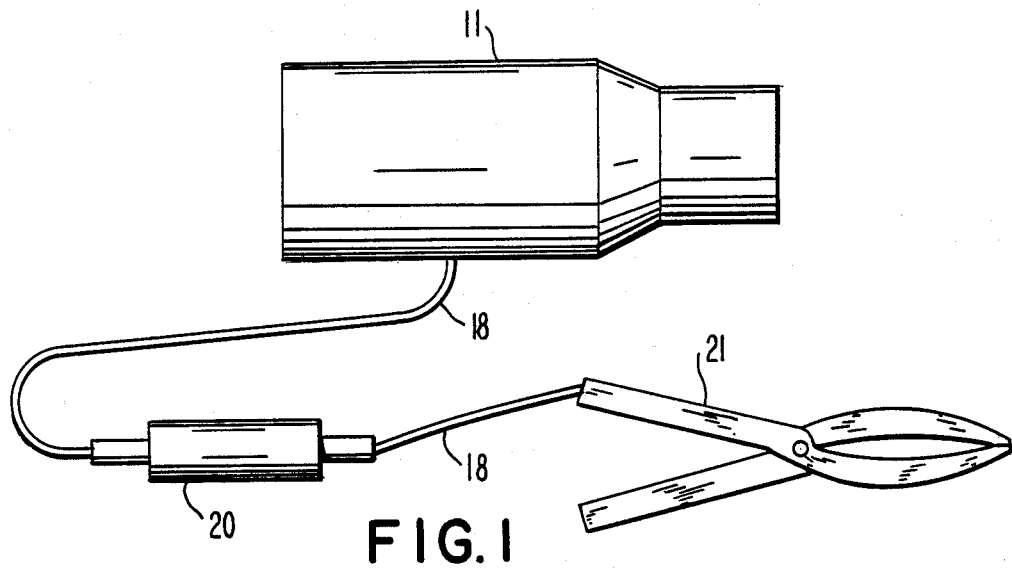
FIG. 1 is a diagrammatic view of the preferred embodiment of the present invention.
Figures 2, 3, 4:
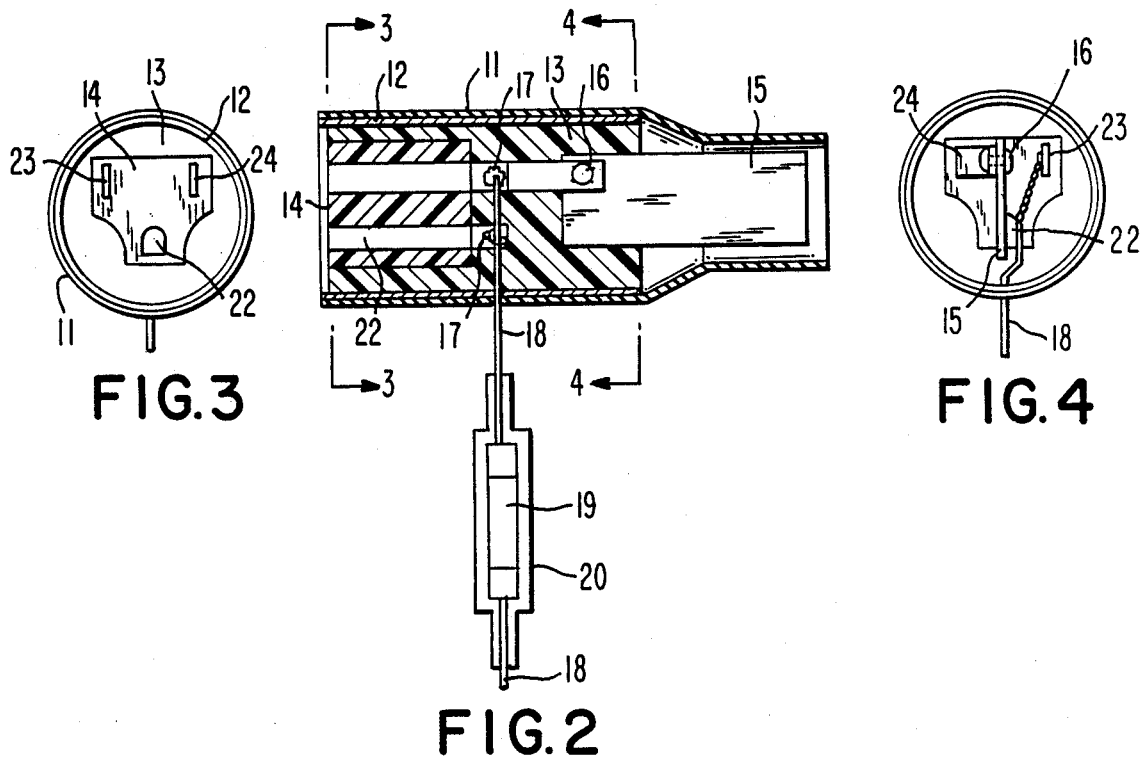
FIG. 2 is a cross sectional view of the adapter plug receptacle and fuse holder illustrated in FIG. 1.
FIG. 3 is an end view taken along lines 3—3 of FIG. 2.
FIG. 4 is a cross sectional view taken along line 4—4 of FIG. 2.

Turning now to a more detailed description of the present invention, there is illustrated in FIGS. 1 and 2 an adapter which includes a tubular housing 12 surrounded and protected by an elastic material 11. The housing is filled with a potting material such as resin 13 which surrounds the various components of the adapter to be described. Mounted within the housing and secured in place by the resin is a conventional 110 to 125 volt type electrical plug receptacle 14. A metallic pick-up strip 15 is connected, as by means of a rivet 16, to one of two power poles of the plug 14. Solder joints 17 connect an insulated wire 18 to the remaining power pole of plug receptacle 14 and to the ground pole of the plug, as well. The insulated wire 18 is a ground wire which is connected through a fuse 19 in a fuse holder 20 to a ground clip 21, by means of which the adapter is connected to a suitable ground point.

As illustrated in FIGS. 2, 3 and 4, an inwardly extending ground pole for the plug receptacle 14 is indicated at 22, while the two power poles for the plug receptacle are illustrated at 23 and 24. As best seen in FIGS. 2 and 4, the metallic pick up 15 is riveted to the power pole 24, while the ground wire 18 is soldered by solder joints 17 to the ground pole 22 and power pole 23. The poles 22, 23 and 24 form female electrical receptacle sockets on the output end of plug receptacle 14, and form male power and ground poles on the input end of the plug 14.

Figure 5:
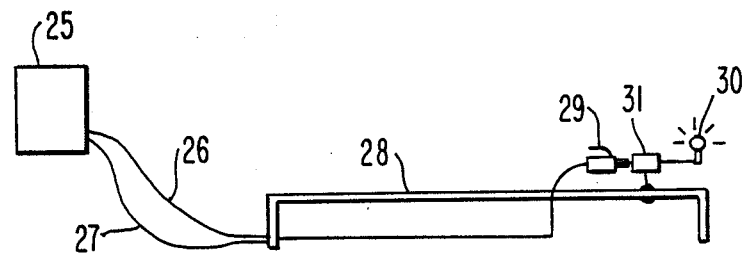
FIG. 5 is a diagrammatic view of the invention in a working environment.

As illustrated in FIG. 5, the adapter of the present invention is connected to an arc welding machine 25 having an electrode output lead 26 and a ground output lead 27. The ground lead is connected to a metal structure 28 which forms an electrical ground, while the electrode output lead 26 is connected to a conventional electrode 29. A hand tool requiring a 110 to 125 volt power source may be connected to the electrode outlet lead of the welding machine 25 by means of the adapter of the present invention, illustrated at 31, by connecting the electrode holder 29 to the metallic pick-up strip 15 and by connecting the ground clip 21 to the electrical ground formed by the metal structure 28. The hand tool may then be plugged into the plug receptacle 14 for operation.

Accordingly, the adapter is used for coupling the welding machine's welding lead with a 110 to 125 volt type electrical plug receptacle. The adapter is connected directly to the end of the welding lead by way of an electrode holder on the welding lead, by inserting the adapter's metallic pick-up strip into the end of the electrode holder. The metallic pick-up strip will couple the power from the welder directly to the power pole 24 of plug receptacle 14. The adapter's ground clip can be clipped to the welding machine's ground lead or to its grounded metal structure, or to any suitable electrical ground. The fuse 19 is coupled with the power pole 23 and the ground pole 22, and the electrical plug receptacle 14 is now ready for use. The adapter thus eliminates the need for heavy, bulky extension cords in the welder's workplace, and greatly increases productivity.

I claim:

1. An adapter for providing electrical power from a welding machine having an output welding lead connected to an electrode holder and having an electrical ground, comprising:
   a tubular housing;
   an electrical plug receptacle mounted in an output end of said housing, said electrical plug receptacle having at least a groud pole and first and second power poles extending within said housing;
   a ground clip;
   a ground wire electrically connected at one end to said ground pole and to said first power pole, and connected at the other end to said ground clip for connection to an electrical ground point;
   a male power pickup strip extending from an input end of said tubular housing and electrically connected to said second power pole within said housing, said power pickup strip being connectable to the electrode holder of the welding machine and being the only conductive strip extending from said housing input end;
   elastic means surrounding and protecting said housing and said power pickup strip; and
   resin means within said housing and surrounding inner ends of said ground and power poles.

2. The adapter of claim 1, further including fuse means in line with said ground wire.

* * * * *